United States Patent
Suh et al.

(10) Patent No.: US 9,145,169 B2
(45) Date of Patent: Sep. 29, 2015

(54) STEERING APPARATUS OF IN-WHEEL MOTOR-DRIVEN

(71) Applicant: Korea Advanced Institute of Science and Technology, Daejeon (KR)

(72) Inventors: In Soo Suh, Daejeon (KR); Min Young Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 14/280,790

(22) Filed: May 19, 2014

(65) Prior Publication Data

US 2015/0175203 A1 Jun. 25, 2015

(30) Foreign Application Priority Data

Dec. 24, 2013 (KR) .......................... 10-2013-0162411

(51) Int. Cl.
*B62D 11/04* (2006.01)
*B62D 6/00* (2006.01)

(52) U.S. Cl.
CPC ................ *B62D 11/04* (2013.01); *B62D 6/003* (2013.01)

(58) Field of Classification Search
CPC ............ B62D 1/00; B62D 6/00; B62D 6/008; B62D 6/08; B62D 6/10; B62D 7/00; B62D 7/06; B62D 7/08; B62D 9/00; B62D 11/00; B62D 11/04; B62D 6/003; B60L 11/00; B60L 11/18; B60L 2240/24; B60L 2240/40; B60L 2240/46; B60L 2240/463; B60K 7/00; B60K 7/0007; B60K 2007/0069; B60K 2007/0076; B60K 2007/0092
See application file for complete search history.

(56) References Cited

U.S. PATENT DOCUMENTS

| | | | | |
|---|---|---|---|---|
| 5,482,125 A | * | 1/1996 | Pagett | 180/6.32 |
| 5,924,506 A | * | 7/1999 | Perego | 180/65.51 |
| 6,219,604 B1 | * | 4/2001 | Dilger et al. | 701/41 |
| 7,398,842 B2 | * | 7/2008 | Fontecchio et al. | 180/6.5 |
| 7,922,184 B2 | * | 4/2011 | Porcheron | 280/93.506 |
| 2009/0024281 A1 | * | 1/2009 | Hwang | 701/42 |
| 2009/0096183 A1 | * | 4/2009 | Haeusler et al. | 280/124.136 |
| 2013/0131927 A1 | * | 5/2013 | Ishihara | 701/43 |
| 2013/0277137 A1 | * | 10/2013 | Kawaguchi et al. | 180/443 |

FOREIGN PATENT DOCUMENTS

| | | | |
|---|---|---|---|
| EP | 1213205 | * | 6/2002 |
| KR | 10-2013-0012827 A | | 2/2013 |
| KR | 2013023956 | * | 3/2013 |

* cited by examiner

*Primary Examiner* — Jerrah Edwards
*Assistant Examiner* — Tamara Weber
(74) *Attorney, Agent, or Firm* — Paratus Law Group, PLLC

(57) ABSTRACT

A steering apparatus of an in-wheel motor-driven electric vehicle capable of steering the vehicle by controlling torques applied to in-wheel motors mounted in road wheels. The steering apparatus of an in-wheel motor-driven vehicle includes a rigid tie rod having both ends rotatably connected to the in-wheel motors of the left and right wheels through hinge pins; a steering information detecting sensor for detecting a steering operation angle and torque according to user's steering operation; and a controller for calculating torque outputs to be applied to the in-wheel motor of the left wheel and the in-wheel motor of the right wheel based on information on the steering operation angle and torque detected by the steering information detecting sensor and vehicle speed information and controlling operation of the in-wheel motor of the left wheel and the in-wheel motor of the right wheel.

4 Claims, 5 Drawing Sheets

STEERING APPARATUS OF IN-WHEEL MOTOR-DRIVEN

CROSS REFERENCE TO PRIOR APPLICATIONS

The present application claims priority under 35 U.S.C. §119 to Korean Patent Application No. 10-2013-0162411 (filed on Dec. 24, 2013), which is hereby incorporated by reference in its entirety.

BACKGROUND OF THE INVENTION

1. Field of Invention

The present invention relates to a steering system of an in-wheel motor-driven electric vehicle, and more particularly, to a steering apparatus of an in-wheel motor-driven electric vehicle capable of steering the vehicle by controlling torques applied to in-wheel motors mounted in road wheels, and a steering control method using the steering apparatus.

2. Description of the Prior Art

Due to seriousness of environmental problems and depletion of limited resources caused by use of fossil fuels such as gasoline, diesel and the like, an environment-friendly vehicle such as an electric vehicle, a fuel cell vehicle, or a hybrid vehicle, driven by motors has been developed and driven.

An in-wheel system is a system having individual small motors (in-wheel motors) respectively installed in road wheels to independently and directly control the respective road wheels in an environment-friendly vehicle using electric power as a power source.

The in-wheel system may have a simple driving system as compared with a vehicle having a large motor provided therein and thus have good utilization of space since the individual motors are mounted in the respective road wheels. Further, the in-wheel system may improve behavior performance of the vehicle since the torques for the respective road wheels can be independently controlled by independently and directly controlling the road wheels.

There are also advantages in that steering by driving can be performed by controlling a difference in torque between the left and right road wheels to generate a lateral force and complicated power transfer units such as a transmission and a differential gear may be omitted.

A vehicle using the conventional in-wheel system is mounted with a rack gear, a pinion gear and a steering electric motor for driving the pinion gear as a steering apparatus, and is steered by controlling the electric motor based on sensor information according to user's steering. In addition, a manner of assisting user's steering force through torque outputs of the in-wheel motors has been generalized.

For example, Korean Laid-open Patent Publication No. 2013-0012827 discloses a control apparatus and method of an in-wheel system vehicle, which may provide a straight drive by correcting torques of left and right in-wheel motors when the vehicle is biased to any one side while driving. The in-wheel system disclosed in the above document includes the following procedure: analyzing information on steering angles, a yaw rate, vehicle speed, and steering torque detected in a driving state, determining a bias direction of the vehicle, if it is determined that the vehicle is biased, determining a direction and degree of the bias according to magnitudes of the steering angles and the yaw rate to determine correction torques of the left and right in-wheel motors, and then, controlling the in-wheel motors by driving torques with the correction torques applied thereto, which are determined from the bias of the main driving torque, thereby providing a straight drive.

However, since the conventional in-wheel motor-driven vehicle as described above should be mounted with an additional steering motor as a steering apparatus, there are disadvantages in that due to the additional steering motor, power loss occurs and a production cost is increased.

PRIOR ART DOCUMENT

Patent Document 1: Korean Laid-open Patent Publication No. 2013-0012827 (Publication Date: Feb. 5, 2013) "Control Apparatus and Method of In-wheel System Vehicle"

SUMMARY OF THE INVENTION

Accordingly, the present invention is conceived to solve the aforementioned problems in the prior art. An object of the present invention is to provide a steering apparatus of an in-wheel motor-driven vehicle, which makes it possible to realize steer-by-wire without an additional steering motor by controlling torques applied to in-wheel motors mounted in road wheels to turn the road wheels in a desired direction to steer the vehicle, and a steering control method using the steering apparatus.

According to an aspect of the present invention for achieving the objects, there is provided a steering apparatus of an in-wheel motor-driven vehicle having in-wheel motors respectively mounted in front or rear left and right wheels of the vehicle. The steering apparatus includes a rigid tie rod having both ends rotatably connected to the in-wheel motors of the left and right wheels through hinge pins; a steering information detecting sensor for detecting a steering operation angle and torque according to user's steering operation; and a controller for calculating torque outputs to be applied to the in-wheel motor of the left wheel and the in-wheel motor of the right wheel based on information on the steering operation angle and torque detected by the steering information detecting sensor and vehicle speed information and controlling operation of the in-wheel motor of the left wheel and the in-wheel motor of the right wheel.

According to another aspect of the present invention, there is provided a steering control method of an in-wheel motor-driven vehicle, which includes (a) detecting a steering operation angle and torque according to user's steering operation; (b) detecting a change in vehicle speed; (c) calculating torque outputs to be applied to an in-wheel motor of a left wheel and an in-wheel motor of a right wheel based on information on the steering operation angle and torque and the change in vehicle speed calculated in the steps (a) and (b); and (d) supplying power to the in-wheel motor of the left wheel and the in-wheel motor of the right wheel according to the torque outputs calculated in the step (c), thereby steering the vehicle.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE PREFERRED EMBODIMENT

Figure 1:
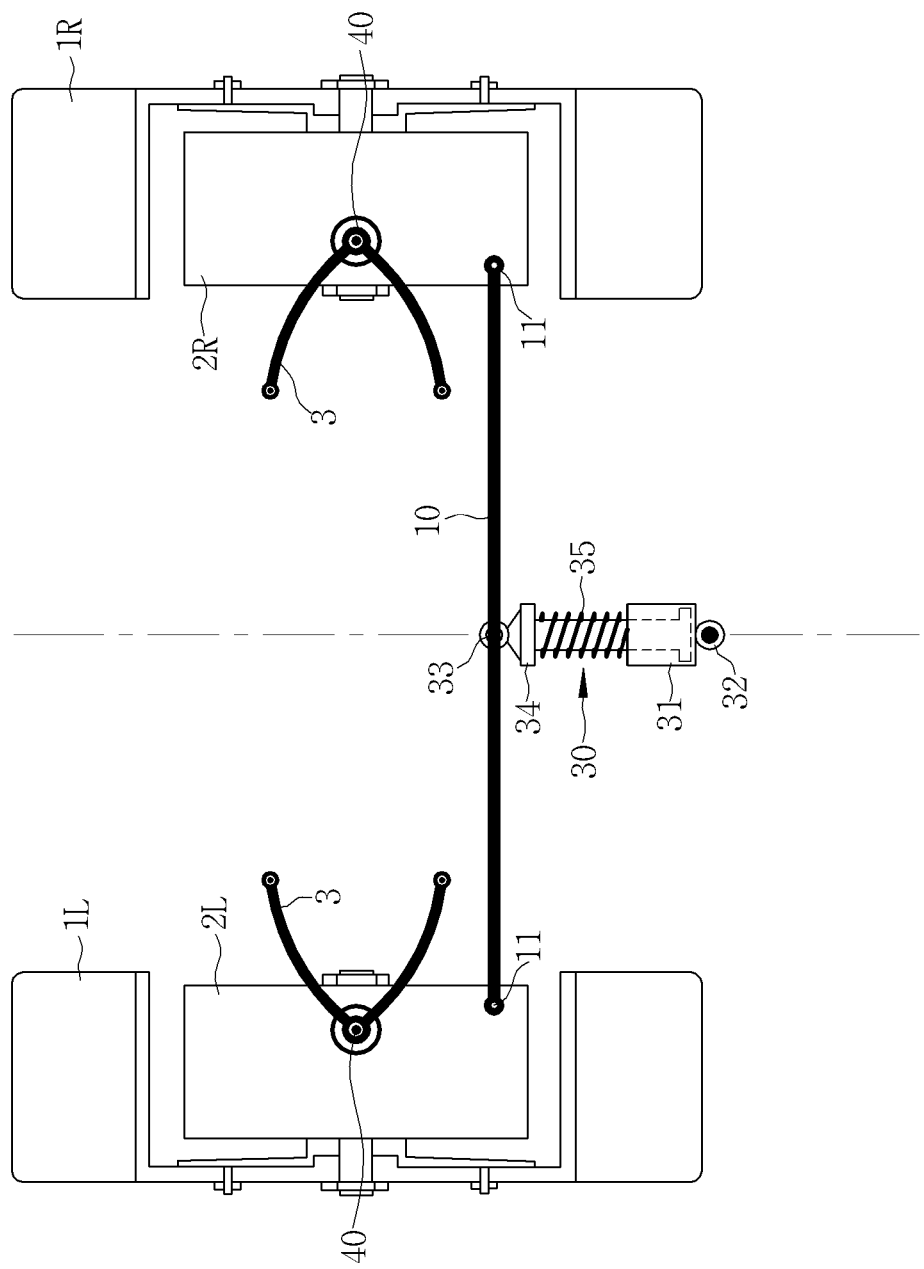
FIG. 1 is a plan view schematically showing a steering apparatus of an in-wheel motor-driven vehicle according to an embodiment of the present invention.
Figure 2:
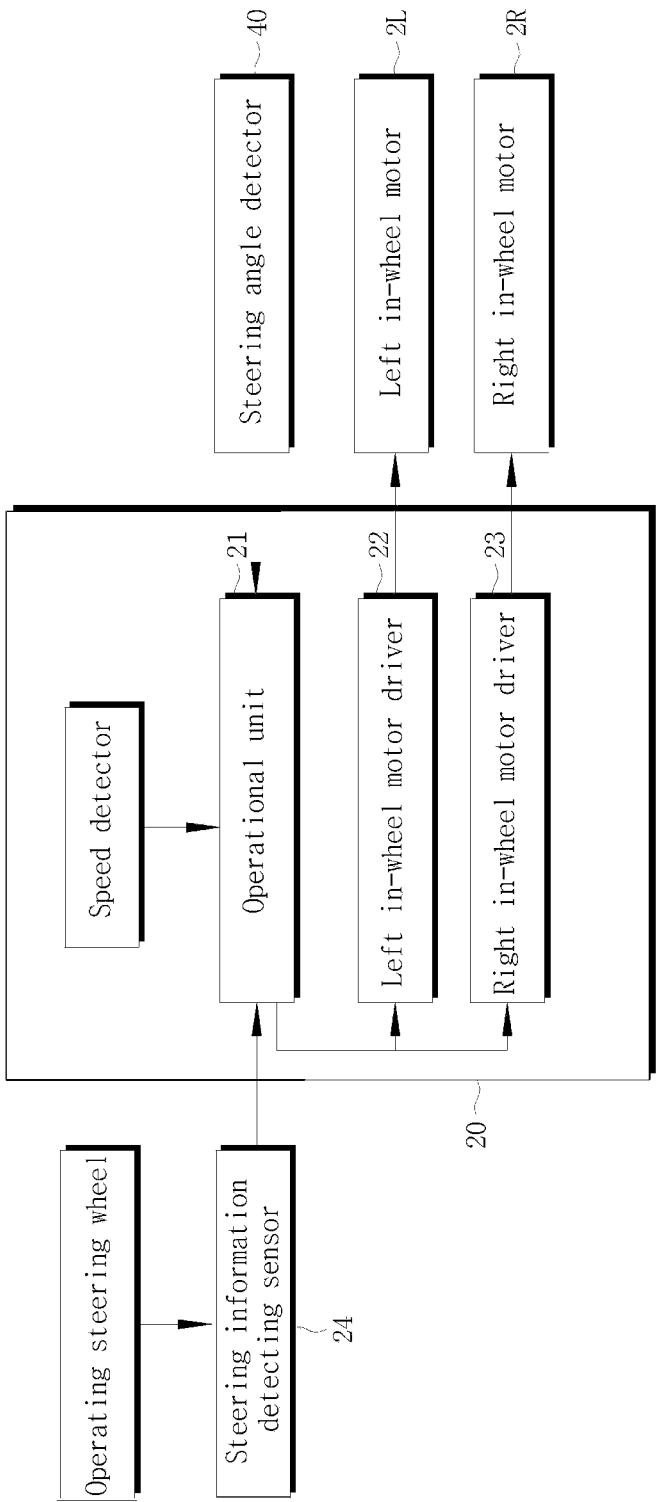
FIG. 2 is a block diagram schematically showing a configuration of a controller of the in-wheel motor-driven vehicle according to the embodiment of the present invention.

Hereinafter, preferred embodiments of a steering apparatus of an in-wheel motor-driven vehicle and a steering control method using the same according to the present invention will be described in detail with reference to the accompanying drawings.

FIGS. 1 to 5 show a steering apparatus of an in-wheel motor-driven vehicle according to one embodiment of the present invention. First, referring to FIGS. 1 and 2, a steering apparatus of an in-wheel motor-driven vehicle according to the present invention, in which in-wheel motors 2L and 2R operated by power supplied from a controller 20 are respectively mounted in front or rear left and right wheels 1L and 1R of the vehicle, includes a rigid tie rod 10 having both ends rotatably connected to the in-wheel motors 2L and 2R of the left and right wheels 1L and 1R through hinge pins 11; a steering information detecting sensor 24 for detecting a steering operation angle and torque according to user's steering operation; the controller 20 for calculating torque outputs to be applied to the in-wheel motor 2L of the left wheel and the in-wheel motor 2R of the right wheel based on the information of the steering operation angle and torque detected by the steering information detecting sensor 24 and vehicle speed information and controlling the operation of the in-wheel motor 2L of the left wheel and the in-wheel motor 2R of the right wheel; a steering angle detector 40 for detecting steering angles of the left and right wheels 1L and 1R rotated around a yaw axis of the vehicle and sending them to the controller 20; a damping member 30 having one end connected to a central portion of the tie rod 10 and the other end connected to a frame of the vehicle to provide an elastic force pulling the tie rod to the vehicle.

The in-wheel motors 2L and 2R are respectively coupled to the insides of the left and right wheels 1L and 1R and elastically connected to the vehicle body through suspension arms 3. The in-wheel motors 2L and 2R include in-wheel motors mounted on a well-known electric vehicle.

The tie rod 10 connects the left wheel 1L and the right wheel 1R to each other, thereby aligning the left and right wheels 1L and 1R, and serves to mutually transmit a moment generated at the left and right wheels 1L and 1R due to a torque difference between the in-wheel motors 2L and 2R.

The steering information detecting sensor 24 is connected to a steering wheel of the vehicle to detect the rotational angle and torque of the steering wheel when the user operates the steering wheel in order to change a direction of the vehicle and sends the detected rotational angle and torque to the controller 20.

In the controller 20, an operational unit 21 receives the information on the steering operation angle and torque detected by the steering information detecting sensor 24 and the vehicle speed information and calculates torque outputs to be respectively applied to the in-wheel motor 2L of the left wheel and the in-wheel motor 2R of the right wheel based on the pieces of information. Then, left and right in-wheel motor drivers 22 and 23 receive a control signal from the operational unit 21 based on the torque outputs of the left and right in-wheel motors 2L and 2R calculated by the operational unit 21 to operate the left and right in-wheel motors 2L and 2R.

The steering angle detector 40 detects steering angles of the left and right wheels rotated around the vertical axis, i.e., the yaw axis, of the vehicle immediately after the left and right wheels 1L and 1R are steered and feeds the steering angles back to the controller 20. Then, the controller 20 determines whether the steering angles of the left and right wheels correspond to desired steering angles through the steering angle information and performs steering angle correction. While in this embodiment, the steering angle detector 40 includes optical encoders or linear encoders, which are coupled to shaft portions connecting the left and right in-wheel motors 2L and 2R and the suspension arms 3 to detect the turned angles, well-known various angle detection sensors or angle detection units may be alternatively used.

The damping member 30 prevents the left and right wheels 1L and 1R from being rapidly steered according to a road condition when a horizontal force is applied to the tie rod 10 due to a torque difference between the left and right wheels 1L and 1R, and generates a restoring force of the next steering. The damping member 30 includes a cylinder part 31 rotatably connected to the vehicle body via a first connection pin 32, a piston part 34 having one end rotatably connected to the central portion of the tie rod 10 via a second connection pin 33 and the other end slidably installed inside the cylinder part 31, and a tensile spring 35 installed between the piston part 34 and the cylinder part 31 to generate the elastic force pulling the piston part 34 to the cylinder part 31.

Hereinafter, a steering control method using the steering apparatus of the in-wheel motor-driven vehicle according to the present invention will be described.

When a driver operates a steering wheel in order to change a direction of a vehicle while driving, the steering information detecting sensor 24 detects a steering wheel rotation angle and torque and sends the rotation angle and torque to the operational unit 21 of the controller 20. Then, the operational unit 21 calculates torque outputs to be applied to the in-wheel motor 2L of the left wheel and the in-wheel motor 2R of the right wheel based on the information on the steering operation angle and torque and a change in vehicle speed. The controller 20 then sends a control signal based on the torque outputs calculated in the operational unit 21 to the left and right in-wheel motor drivers 22 and 23 to control the operation of the in-wheel motor 2L of the left wheel and the in-wheel motor 2R of the right wheel.

Figure 3:
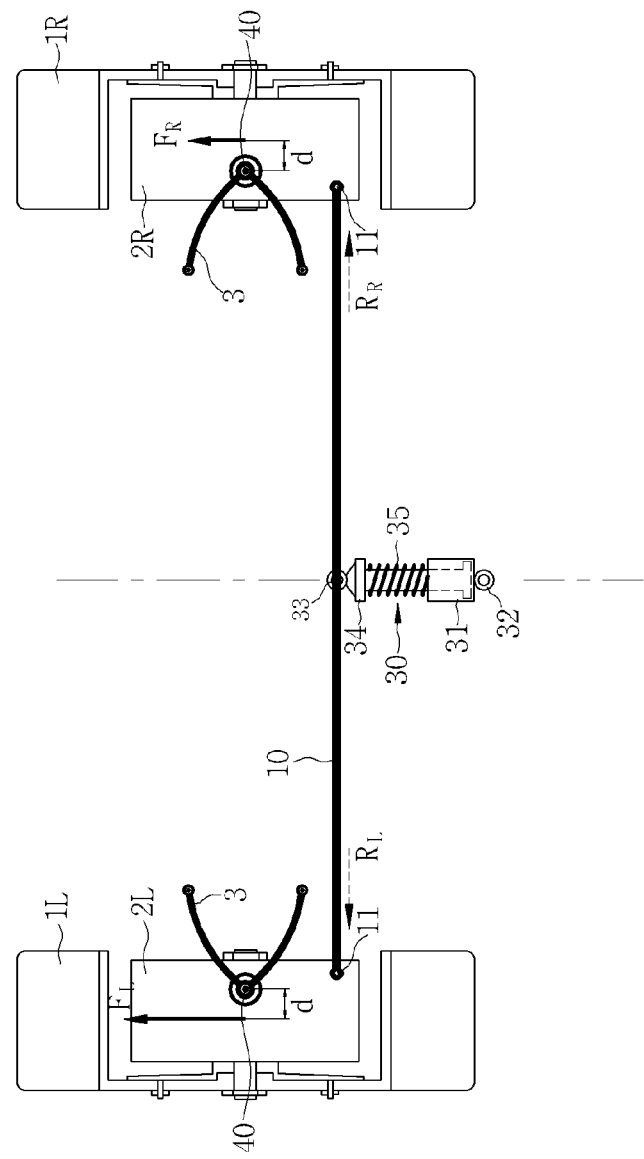
FIGS. 3 to 5 are plan views showing an operation example of the steering apparatus of FIG. 1.
Figure 4:
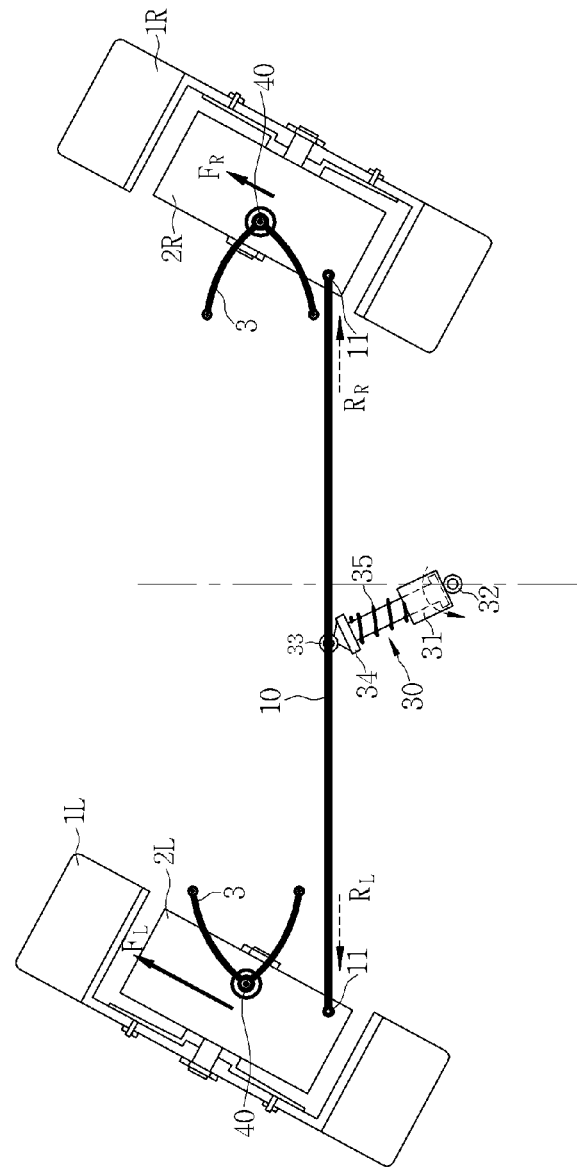

For example, in order to change the vehicle direction to the right side in a constant speed state or an accelerated state while driving, as shown in FIGS. 3 and 4, if the control is performed so that the torque of the left in-wheel motor 2L is larger than that of the right in-wheel motor 2R, the torque difference causes the left wheel 1L and the right wheel 1R to turn to the right side, whereby the vehicle turns right. At this time, a larger tension is applied to the left side of the tie rod 10 than the right side, and thus, the tie rod 10 is pulled to the left side to turn the left wheel 1L and the right wheel 1R simultaneously.

In addition, the damping member 30 is inclined to the left side and the piston part 34 and the tensile spring 35 are extended to generate an elastic force pulling the piston part 34 to the center of the vehicle. Thus, it is possible to prevent the wheels from being rapidly steered according to a road condition.

When the left and right wheels 1L and 1R are turned to change the direction of the vehicle as described above, the steering angle detector 40 detects steering angles of the left and right wheels rotated around the yaw axis of the vehicle and feeds them back to the controller 20. The controller 20 determines whether the steering angles of the left and right wheels correspond to the steering angles calculated in the operational unit 21 based on the steering angle information. If there is a difference with the intended steering angles, the steering angles are corrected by applying a corrected control signal to the drivers of the left and right in-wheel motors 2L and 2R.

Figure 5:
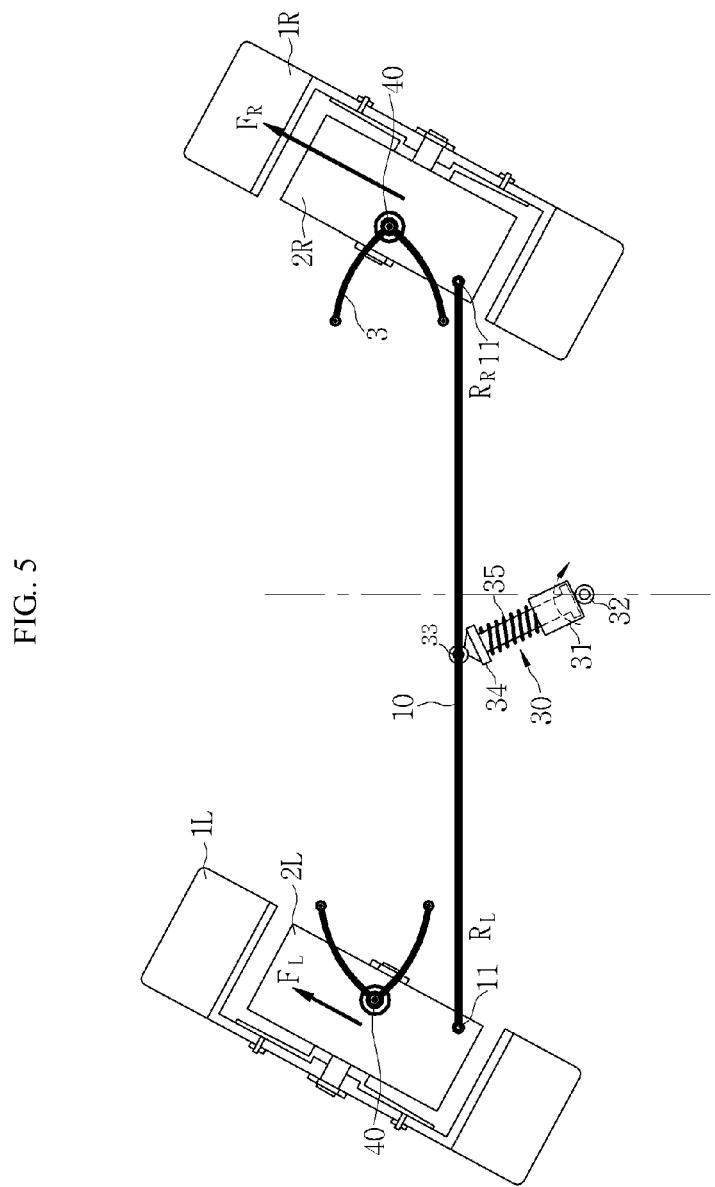

Then, if the driver turns the steering wheel to the left side again, as shown in FIG. 5, the torque of the right in-wheel motor 2R is enlarged more than that of the left in-wheel motor 2L and a moment for turning the left wheel 1L and the right wheel 1R to the left side is generated. A larger tension is applied to the right side of the tie rod 10 than the left side, and thus, the left wheel 1L and the right wheel 1R turn to the left side. At this time, it is possible to obtain an advantage in that a force for restoring the tie rod 10 to its original position by the elastic force of the tensile spring 35 of the damping member 30 is increased to more improve steering stability.

According to the present invention as described above, it is possible to realize steer-by-wire without an additional steering motor by controlling the torques applied to the left wheel in-wheel motor 2L and the right wheel in-wheel motor 2R to turn the left and right wheels 1L and 1R in a desired direction and steer the vehicle.

In addition, there are advantages in that the driving and steering can be controlled through single integrated hardware and optimal control can be performed according to road and tire conditions while driving.

Further, since an electric motor, a rack gear, a pinion gear and the like, which are additionally needed for steering, need not be configured, a production cost is reduced and system maintenance is simplified.

While the present invention has been described in detail with reference to the embodiments, it will be apparent to those skilled in the art that various substitutions, additions and modifications can be made thereto without departing from the above-described technical spirit. It will be understood that the substitutions, additions and modifications will be considered to fall in the scope of the present invention defined by the appended claims.

What is claimed is:

1. A steering apparatus of an in-wheel motor-driven vehicle having in-wheel motors respectively mounted in front or rear left and right wheels of the vehicle, the steering apparatus comprising:

a rigid tie rod having both ends rotatably connected to the in-wheel motors of the left and right wheels through hinge pins;

a steering information detecting sensor for detecting a steering operation angle and torque according to users steering operation; and a controller for calculating torque outputs to be applied to the in-wheel motor of the left wheel and the in-wheel motor of the right wheel based on information on the steering operation angle and torque detected by the steering information detecting sensor and vehicle speed information and controlling operation of the in-wheel motor of the left wheel and the in-wheel motor of the right wheel, wherein a damping member includes a cylinder part rotatably connected to the vehicle body, a piston part having one end rotatably connected to the central portion of the tie rod and the other end slidably installed inside the cylinder part, and a tensile spring installed between the piston part and the cylinder part to generate the elastic force pulling the piston part to the cylinder part.

2. The steering apparatus according to claim 1, wherein the damping member having one end connected to a central portion of the tie rod and the other end connected to a vehicle body to provide an elastic force pulling the tie rod to the vehicle.

3. The steering apparatus according to claim 1, further comprising a steering angle detector for detecting steering angles of the left and right wheels rotated around a yaw axis of the vehicle and sending them to the controller.

4. The steering apparatus according to claim 3, wherein the steering angle detector includes encoders installed at connecting portions of the suspension arms and the in-wheel motors of the left and right wheels.

* * * * *